United States Patent
Jindal et al.

(10) Patent No.: US 12,316,478 B2
(45) Date of Patent: May 27, 2025

(54) DYNAMIC ON-DEMAND VIRTUAL PRIVATE NETWORK (VPN) SESSION DISTRIBUTION FOR GATEWAYS

(71) Applicant: VMware LLC, Palo Alto, CA (US)

(72) Inventors: Gaurav Jindal, Pune (IN); Hussaina Begum Nandyala, Nandyal (IN); Bhargav Puvvada, Guntur (IN)

(73) Assignee: VMware LLC, Palo Alto, CA (US)

( * ) Notice: Subject to any disclaimer, the term of this patent is extended or adjusted under 35 U.S.C. 154(b) by 428 days.

(21) Appl. No.: 17/958,513

(22) Filed: Oct. 3, 2022

(65) Prior Publication Data
US 2024/0022452 A1     Jan. 18, 2024

(30) Foreign Application Priority Data

Jul. 14, 2022   (IN) .............................. 202241040496

(51) Int. Cl.
*H04L 61/09*       (2022.01)
*H04L 12/46*       (2006.01)
*H04L 12/66*       (2006.01)
*H04L 61/256*      (2022.01)

(52) U.S. Cl.
CPC .......... *H04L 12/4641* (2013.01); *H04L 12/66* (2013.01); *H04L 61/256* (2013.01)

(58) Field of Classification Search
CPC ....... G06F 9/45558; G06F 2009/45587; H04L 12/4641; H04L 12/66; H04L 61/2514; H04L 61/256; H04L 61/5007; H04L 63/0254; H04L 63/0272; H04L 63/20
See application file for complete search history.

(56) References Cited

U.S. PATENT DOCUMENTS

| | | | |
|---|---|---|---|
| 8,104,081 B2 | 1/2012 | Khanna et al. | |
| 10,257,167 B1 | 4/2019 | Matthews | |
| 10,484,279 B2 | 11/2019 | Cohn et al. | |
| 10,491,427 B2 * | 11/2019 | Akune | H04L 61/256 |
| 2014/0101324 A1 * | 4/2014 | Young | H04L 45/50 709/228 |
| 2017/0034129 A1 * | 2/2017 | Sawant | H04L 12/4633 |
| 2021/0021523 A1 * | 1/2021 | Wang | H04L 63/0272 |
| 2022/0231993 A1 * | 7/2022 | Sharma | H04L 63/0272 |
| 2022/0393981 A1 * | 12/2022 | Solanki | H04L 47/805 |
| 2022/0394014 A1 * | 12/2022 | Wang | H04L 63/20 |
| 2022/0394016 A1 * | 12/2022 | Solanki | H04L 12/4641 |
| 2022/0394017 A1 * | 12/2022 | Solanki | H04L 63/0428 |
| 2023/0412495 A1 * | 12/2023 | Wang | H04L 61/256 |

* cited by examiner

*Primary Examiner* — Frank Duong
(74) *Attorney, Agent, or Firm* — King Intellectual Asset Management (57) ABSTRACT

The disclosure provides an approach for processing inter-network communications. Embodiments include configuring, by a management component of a data center, a first virtual private network (VPN) session between a first endpoint outside of the data center and a first gateway of the data center. Embodiments include configuring, by the management component, a second VPN session between a second endpoint outside of the data center and a second gateway of the data center. Embodiments include programming, by the management component, one or more network address translation (NAT) tables of the data center such that, for the first VPN session and the second VPN session, a single public network address of the data center is exposed to the first endpoint and the second endpoint.

20 Claims, 5 Drawing Sheets

DYNAMIC ON-DEMAND VIRTUAL PRIVATE NETWORK (VPN) SESSION DISTRIBUTION FOR GATEWAYS

RELATED APPLICATIONS

Benefit is claimed under 35 U.S.C. 119(a)-(d) to Foreign Application Serial No. 202241040496 filed in India entitled "DYNAMIC ON-DEMAND VIRTUAL PRIVATE NETWORK (VPN) SESSION DISTRIBUTION FOR GATEWAYS", on Jul. 14, 2022, by VMware, Inc., which is herein incorporated in its entirety by reference for all purposes.

BACKGROUND

A software defined datacenter (SDDC) provides a plurality of host computer systems (hosts) in communication over a physical network infrastructure of a datacenter such as an on-premise datacenter or a cloud datacenter. Each host has one or more virtualized endpoints such as virtual machines (VMs), containers, or other virtual computing instances (VCIs). These VCIs may be connected across the multiple hosts in a manner that is decoupled from the underlying physical network, which may be referred to as an underlay network. The VCIs may be connected to one or more logical overlay networks which may be referred to as software-defined networks (SDNs) and which may each span multiple hosts. The underlying physical network and the one or more logical overlay networks may use different addressing. Though certain aspects herein may be described with respect to VMs, it should be noted that the techniques herein may similarly apply to other types of VCIs.

Any arbitrary set of VCIs in a datacenter may be placed in communication across a logical Layer 2 network by connecting them to a logical switch. A logical switch is collectively implemented by at least one virtual switch on each host that has a VCI connected to the logical switch. Virtual switches provide packet forwarding and networking capabilities to VCIs running on the host. The virtual switch on each host operates as a managed edge switch implemented in software by the hypervisor on each host. As referred to herein, the terms "Layer 2," "Layer 3," etc. refer generally to network abstraction layers as defined in the OSI model. However, these terms should not be construed as limiting to the OSI model. Instead, each layer should be understood to perform a particular function which may be similarly performed by protocols outside the standard OSI model. As such, methods described herein are applicable to alternative networking suites.

A logical Layer 2 network infrastructure of a datacenter may be segmented into a number of Layer 2 (L2) segments, each L2 segment corresponding to a logical switch and the VCIs coupled to that logical switch. A datacenter may implement a layer 2 virtual private network (L2VPN) to extend one or more L2 segments of the datacenter. Each L2 segment extended by the L2VPN may secure the connection using a security protocol such as an IP security (IPsec) protocol. IPsec protocols are widely used to protect packets communicated between endpoints, such as over the Internet, between gateways, between datacenters (e.g., on premises datacenters, cloud datacenters, etc.), within datacenters, etc. For example, the endpoints (e.g., VCIs, gateways, hosts, etc.) may be configured with IPsec protocols to engage in an internet key exchange (IKE) negotiation process to establish an IKE tunnel. An IKE tunnel allows for the endpoints to further establish an IPsec tunnel to provide security associations (SAs) between the endpoints. Each SA is a one-way or simplex connection and, therefore, at least two SAs are established between two endpoints—one for each direction. Endpoints with an IPsec tunnel established between them may also be referred to as IPsec peers. Each SA is a form of contract between the IPsec peers detailing how to exchange and protect information exchanged between the IPsec peers. In some implementations, each SA uses a mutually agreed-upon key, one or more security protocols, and/or a security parameter index (SPI) value. Each IPsec peer has an IPsec virtual tunnel interface (VTI) that provides a routable interface for terminating IPsec tunnels. Packets transmitted through the VTI will be encrypted and sent through IPsec tunnel. Accordingly, after SAs have been established between two endpoints, an IPsec protocol may be used to protect data packets for transmission through the VTI.

There are various types of traffic that may be transmitted over a VPN connection such as an L2VPN between connected datacenters, such as management traffic, infrastructure traffic, application traffic, site recovery traffic, hybrid cloud extension traffic, workload traffic, service insertion traffic, VCI migration traffic, and/or the like. In existing implementations, all VPN sessions between a data center and external endpoints (e.g., other data centers) are configured on a single gateway of the data center, and that gateway is responsible for encryption and decryption of traffic transmitted over all VPN sessions (e.g., using IPsec protocols). VPN sessions are conventionally tied to a unique local endpoint that can only be hosted on a single default gateway. Thus, in existing techniques, all VPN sessions are limited by the computing resources of the single default gateway, such as processing, memory, uplink and downlink communication resources, and/or the like. In some cases, computing resources at the gateway may become exhausted, particularly when multiple VPNs are configured on the gateway.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for dynamic distribution of virtual private network (VPN) sessions across a set of gateways. As explained in further detail below, computing resource utilization information may be used to determine an optimal distribution of VPN sessions, such as L2VPN sessions, across multiple gateways of a data center. For example, rather than configuring all VPN sessions between a data center and endpoints outside of the data center (e.g., other data centers) on a single default gateway of the data center, VPN sessions may be distributed across multiple gateways based on data relating to computing resource utilization at the gateways (e.g., in real time). Thus, a computing resource utilization can be balanced across a set of gateways and the overloading computing resources on a single gateway can be avoided.

Separate gateways have different network addresses within an L2 network. Therefore, to avoid inconsistencies in endpoint network addresses associated with VPN connections, a single public network address may be exposed for all VPN sessions (e.g., regardless of the gateways on which the VPN sessions are configured). This may be achieved through network address translation (NAT). For example, a source NAT (SNAT) table of the data center may be configured to translate source network addresses of all VPN packets sent from the data center to the single public network address (e.g., replacing the individual network addresses of the gateways in the packets with this single public network address). Similarly, a destination NAT (DNAT) table of the data center may be configured to translate a destination network address of each VPN packet received from an endpoint outside the data center (all such packets will have the single public network address as a destination network address) to the individual network address of the gateway on which the VPN session corresponding to the packet is configured (e.g., replacing the single public network address in the packet with the individual network address of the applicable gateway). Thus, the dynamic distribution of VPN sessions across gateways that is described herein may be transparent to endpoints outside of the data center.

Furthermore, to enable efficient movement of VPN sessions between gateways based on resource utilization conditions over time, every VPN session may be configured as a "real" VPN session on one gateway and as a "shadow" VPN session on one or more other gateways. For example, a first VPN session may be configured as a real VPN session on a first gateway and as a shadow VPN session on the second gateway. The gateway on which the real VPN session is configured (e.g., the first gateway) will actually perform VPN functionality, such as transmitting and receiving traffic, encrypting and decrypting traffic, and/or the like. The gateway on which the shadow VPN session is configured (e.g., the second gateway) stores configuration data of the first VPN session, but does not actually perform VPN functionality. For example, the management plane may send the second gateway all applicable configuration data related to the first VPN session. If resource utilization on the first and/or second gateways changes in such a manner that the first VPN session would function more effectively on the second gateway (e.g., if utilization of one or more types of computing resources on the first gateway exceeds an applicable threshold), then the shadow VPN session on the second gateway may be changed to a real VPN session and the real VPN session on the first gateway may be changed to a shadow VPN session. DNAT and SNAT table entries may be updated accordingly so that the second gateway receives all incoming traffic for the first VPN session and so that all outgoing traffic for the first VPN session sent from the second gateway is translated to include the single public network address as a source network address. The configuration and/o state data related to the first VPN session will already be stored by the second gateway by virtue of the shadow VPN session, so the second gateway will be able to take over actual VPN functionality for the first VPN session with little to no delay.

Techniques described herein provide many improvements with respect to existing techniques for configuring VPN sessions between a data center and endpoints outside of the data center. For example, by dynamically distributing VPN sessions across multiple gateways based on computing resource utilization information, embodiments of the present disclosure improve the functioning of the VPN sessions and the computing devices that implement the VPN sessions. Furthermore, by exposing a single public network address for all VPN sessions between a data center and endpoints outside of the data center, techniques described herein reduce complexity associated with communicating with a data center via a VPN session and allow VPN sessions to be dynamically moved between gateways without impact to external endpoints. Additionally, by configuring real and shadow VPN sessions on separate gateways as described herein, embodiments of the present disclosure allow a VPN session to be quickly moved between gateways (e.g., based on dynamic computing resource utilization information) without requiring the VPN session to be reconfigured on the destination gateway at the time of the move.

It is noted that while certain embodiments are described with respect to L2VPN sessions, techniques described herein may be utilized with other types of VPN sessions as well, such as Layer 3 VPN (L3VPN) sessions, policy-based VPN (PBVPN) sessions, route-based VPN (RBVPN) sessions, and/or the like.

Figure 1:
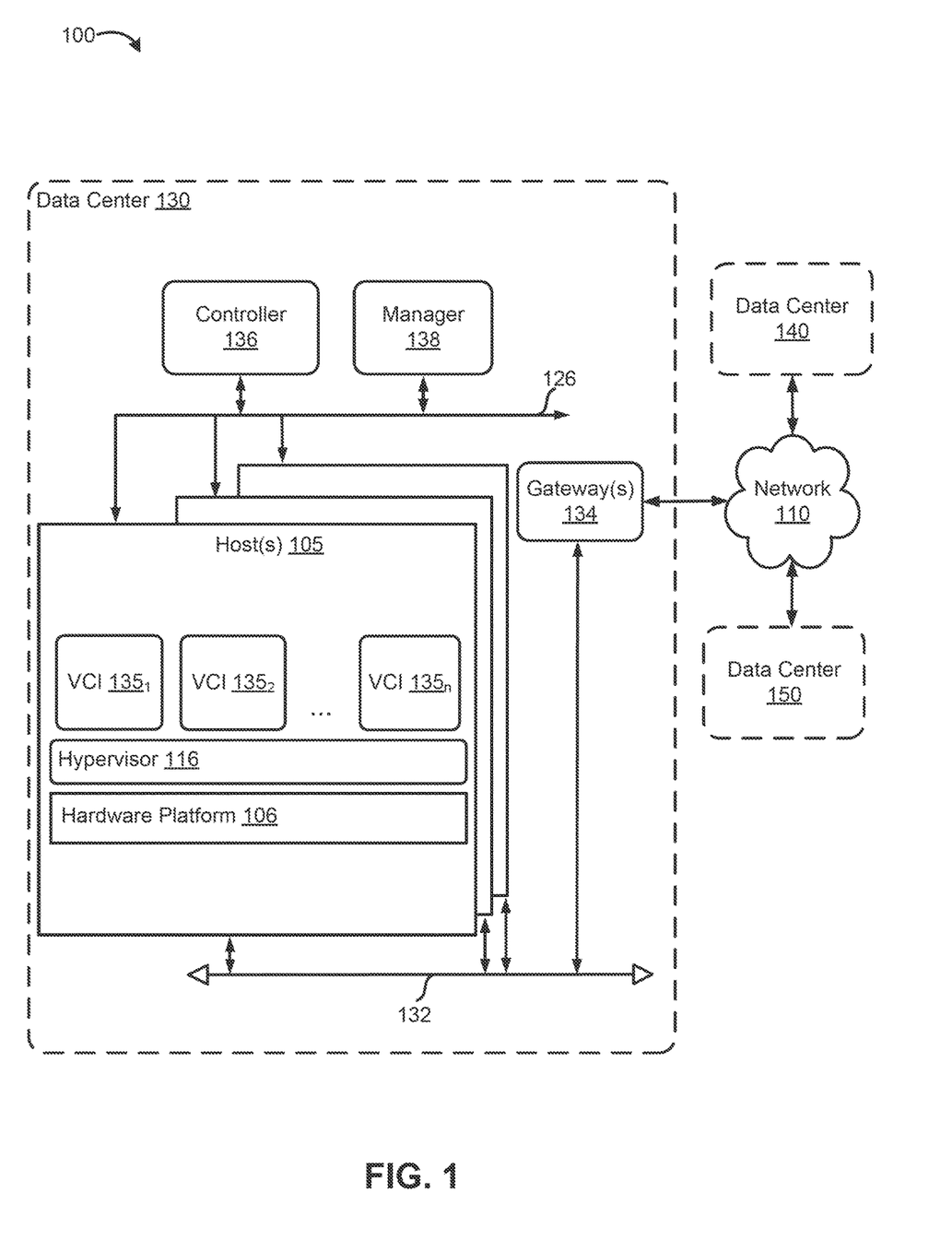
FIG. 1 is an illustration of example physical and virtual network components with which embodiments of the present disclosure may be implemented.

FIG. 1 is an illustration of example physical and virtual network components with which embodiments of the present disclosure may be implemented.

Networking environment 100 includes data center 130 connected to network 110. Network 110 is generally representative of a network of machines such as a local area network ("LAN") or a wide area network ("WAN"), a network of networks, such as the Internet, or any connection over which data may be transmitted.

Data center 130 generally represents a set of networked machines and may comprise a logical overlay network. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

One or more additional data centers 140 are connected to data center 130 via network 110, and may include components similar to those shown and described with respect to data center 130. Communication between the different data centers may be performed via gateways associated with the different data centers. In particular embodiment, one or more of data centers 140 are connected to data center 130 via one or more VPN sessions such as L2VPN sessions.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway(s) 134 provide VCIs 135 and other components in data center 130 with connectivity to network 110, and is used to communicate with destinations external to data center 130 (not shown). Gateway(s) 134 may be implemented as one or more VCIs, physical devices, and/or software modules running within one or more hosts 105. For example, gateway(s) 134 may be connected to one or more corresponding gateways in data center 140 and/or data center 150 via one or more VPN sessions, as described in more detail below with respect to FIGS. 2-5.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user. In certain embodiments, a user defines one or more VPN sessions, such as L2VPN sessions, with one or more endpoints external to data center 130 via manager 138.

As described in more detail below with respect to FIG. 2, manager 138 (and/or controller 136) may distribute a plurality of VPN sessions across a plurality of gateways 134, such as based on resource utilization information from the gateways. According to certain embodiments, manager 138 may receive information about utilization of various types of computing resources (e.g., processing, memory, uplink and downlink communications, and/or the like) on gateway(s) 134, such as from one or more hypervisors 116 on one or more hosts 105. In some embodiments, computing resource utilization information relating to gateway(s) 134 is received from one or more monitoring components in data center 130 that track utilization of computing resources by endpoints in data center 130. Manager 138 uses the computing resource utilization information to determine on which of gateway(s) 134 to configure each given VPN session that is established between data center 130 and external endpoints such as data centers 140 and/or 150.

Figure 2:
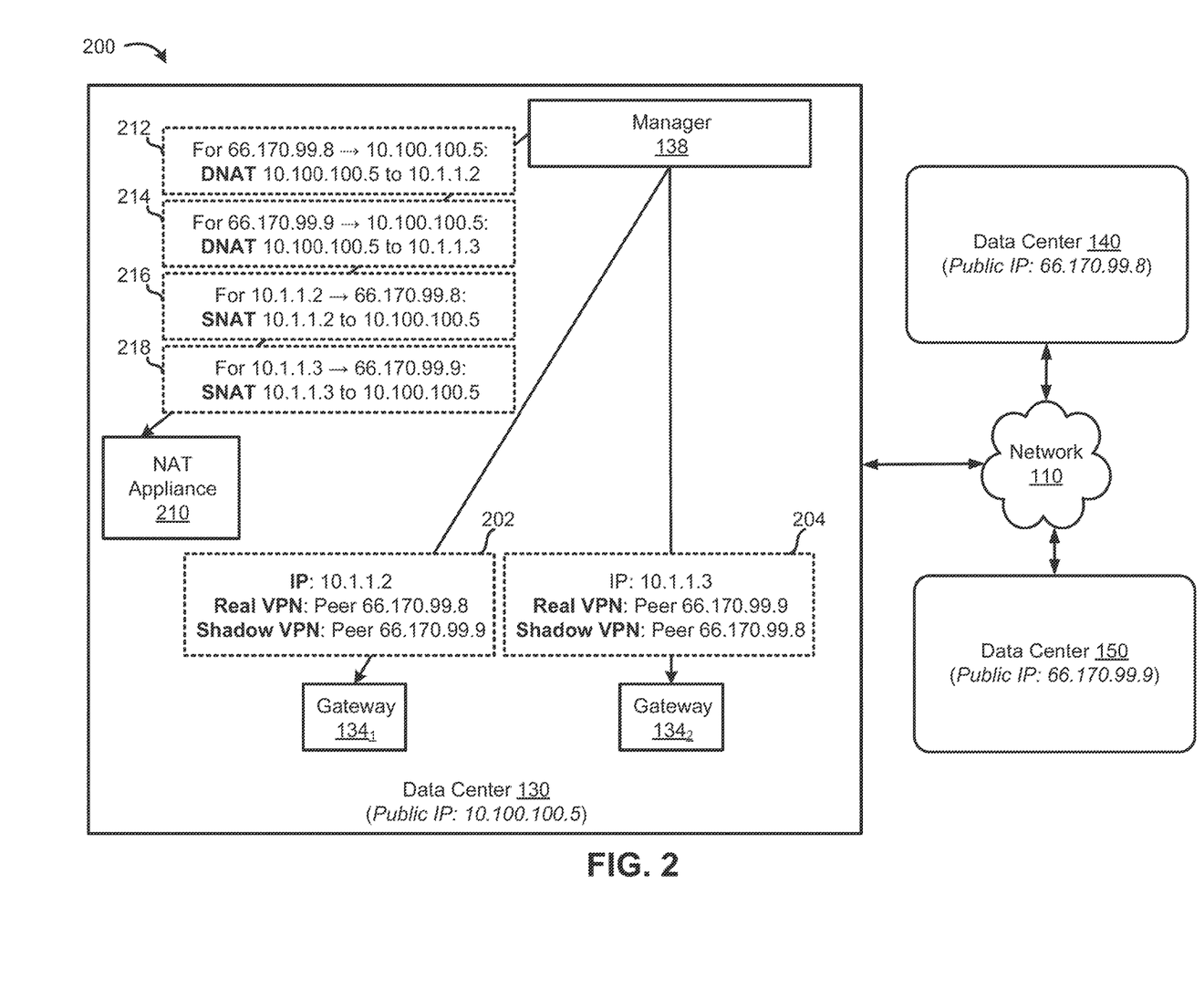
FIG. 2 is an illustration of an example related to dynamic virtual private network (VPN) session distribution for gateways.

FIG. 2 shows an example environment 200 for implementing dynamic virtual private network (VPN) session distribution for gateways. Environment 200 includes network 110; data centers 130, 140, and 150; manager 13; and gateways 134, all previously described with reference to FIG. 1. Gateways $134_1$ and $134_2$ may be virtual machines that execute edge services gateway (ESG) software, and can be referred to as virtual gateway appliances or gateway VMs. The ESG software may provide a number of network services for connected software-defined networks such as firewall, load balancing, intrusion detection, domain name, DHCP, and VPN services. While gateways may be implemented on virtual machines, it is also possible to implement them directly on dedicated physical computer hardware (i.e., without a hypervisor layer).

Data center 130 has a public network address (e.g., internet protocol (IP) address) of 10.100.100.5. Similarly, data center 140 has a public network address of 66.170.99.8 and data center 150 has a public network address of 66.170.99.9. The public network address of a data center is the network address that is exposed to endpoints external to the data center.

Manager 138 configures gateways $134_1$ and $134_2$, assigning gateway $134_1$ a network address of 10.1.1.2 and assigning gateway $134_2$ a network address of 10.1.1.3. The network addresses of gateways $134_1$ and $134_2$ may represent Layer 2 (L2) network addresses.

Two VPN sessions, such as L2VPN sessions, are configured on manager 138, such as by a network administrator. The first VPN session is between data center 130 and data center 140, and the second VPN session is between data center 130 and data center 150. Manager 138 uses techniques described herein to implement the VPN sessions in a dynamic, resource-aware manner.

Manager 138 determines to configure the first VPN session on gateway $134_1$ and to configure the second VPN session on gateway $134_2$, such as based on computing resource utilization information. For example, manager 138 may determine that gateway $134_1$ can only support one VPN session (e.g., due to limitations on available processing, memory, and/or network communication resources) and that gateway $134_2$ can support one or more VPN sessions. In one embodiment, gateway $134_2$ already exists prior to the configuration of the VPN sessions, while in another embodiment manager 138 creates gateway $134_2$ dynamically based on determining that gateway $134_1$ does not have sufficient computing resources available to support both VPN sessions (or at least that the VPN sessions would function better if distributed across two gateways).

In order to implement the configuration of the two VPN sessions, manager 128 configures a "real" VPN session on gateway $134_1$ having a peer network address of 66.170.99.8 (e.g., the public network address of data center 140) and a "real" VPN session on gateway $134_2$ having a peer network address of 66.170.99.9 (e.g., the public network address of data center 150). In certain embodiments, manager 138 also configures a "shadow" VPN session on gateway 134$_1$ having a peer network address of 66.170.99.9 (e.g., the public network address of data center 150) and a "shadow" VPN session on gateway 134$_2$ having a peer network address of 66.170.99.8 (e.g., the public network address of data center 140). Thus, the VPN session between data center 130 and data center 140 is actually implemented via gateway 134$_1$ (e.g., gateway 134$_1$ handles processing and transmission of traffic for this VPN session), and gateway 134$_2$ serves as a standby gateway for this VPN session, having the relevant configuration information so that it can take over actual implementation of the VPN session at a later point in time if requested (e.g., based on changes in computing resource utilization). Similarly, the VPN session between data center 130 and data center 150 is actually implemented via gateway 134$_2$, and gateway 134$_1$ serves as a standby gateway for this VPN session.

Manager 138 also programs one or more network address translation (NAT) tables associated with a NAT appliance 210 based on the configurations of the two VPN sessions. NAT appliance 210 generally represents a VCI that performs source NAT (SNAT) and/or destination NAT (DNAT) functionality for data center 130. NAT appliance 210 may, for example, be a router, firewall, gateway, or the like. While NAT appliance 210 is depicted separately from gateways 134, functionality described herein with respect to NAT appliance 210 may be performed by one or more of gateways 134. In some embodiments, functionality described with respect to NAT appliance 210 is performed by one or more components on host 105 (FIG. 1) and NAT rules are defined and pushed from manager 138 to host 105 (FIG. 1). In some embodiments, functionality described with respect to NAT appliance 210 may be implemented by of a daemon or process running on hypervisor 116 (FIG. 1) and controlled by manager 138.

SNAT is a technique of translating source IP addresses and/or source ports in packet headers to other IP addresses and/or ports. For example, a router's or gateway's firewall may convert IP addresses contained in packets sent from devices in a private overlay network to public IP addresses when those packets pass through the firewall to an external network. Similarly, DNAT involves translating destination IP addresses and/or destination ports in packet headers of packets sent to devices in the overlay network from an external network from public IP addresses to the private IP addresses of the devices within the overlay network.

Manager 138 programs entries 212, 214, 216, and 218 into one or more SNAT and/or DNAT tables associated with NAT appliance 210. Entry 212 indicates that, for all incoming traffic from network address 66.170.99.8 (e.g., data center 140) to 10.100.100.5 (the public network address of data center 130), the destination address of such traffic is to be translated from to 10.1.1.2 (the network address of gateway 134$_1$). Entry 214 indicates that, for all incoming traffic from network address 66.170.99.9 (e.g., data center 150) to 10.100.100.5 (the public network address of data center 130), the destination address of such traffic is to be translated from 10.100.100.5 to 10.1.1.3 (the network address of gateway 134$_2$). Entry 216 indicates that, for all outgoing traffic from network address 10.1.1.2 (e.g., gateway 134$_1$) to 66.170.99.8 (data center 140), the source address of such traffic is to be translated from 10.1.1.2 to 10.100.100.5 (the public network address of data center 130). Entry 218 indicates that, for all outgoing traffic from network address 10.1.1.3 (e.g., gateway 134$_3$) to 66.170.99.9 (data center 150), the source address of such traffic is to be translated from 10.1.1.3 to 10.100.100.5 (the public network address of data center 130).

Figure 3:
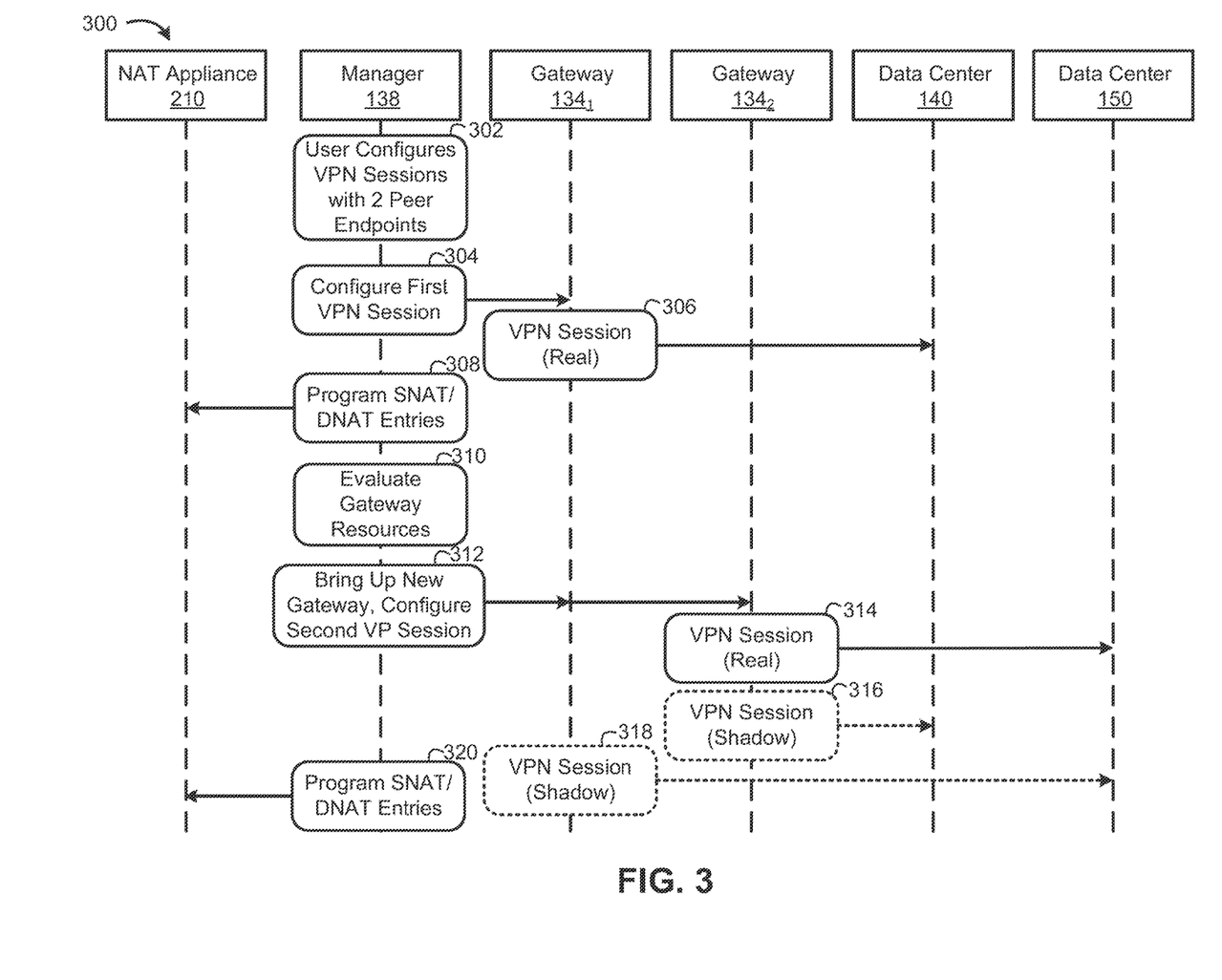
FIG. 3 depicts an example exchange of messages between components related to dynamic VPN session distribution for gateways.

FIG. 3 depicts an example exchange 300 of messages between components related to dynamic VPN session distribution for gateways. FIG. 3 includes NAT appliance 210 and gateways 134$_1$ and 134$_2$ of FIG. 2 and manager 138, data center 140, and data center 150 of FIG. 1.

At step 302, a user configures VPN sessions with two peer endpoints via manager 138. For example, a network administrator may provide input to a user interface associated with manager 138 to configure a first VPN session with data center 140 and a second VPN session with data center 150.

At step 304, manager 138 configures the first VPN session on gateway 134$_1$ and, at step 306, the first VPN session is established as a "real" VPN session between gateway 134$_1$ and data center 140 (e.g., with a corresponding gateway of data center 140). In some embodiments, establishing the VPN session involves using an IPsec protocol to engage in an internet key exchange (IKE) negotiation process to establish an IKE tunnel, which allows the gateways of the respective data centers to further establish an IPsec tunnel to provide security associations (SAs) between the endpoints. Accordingly, after SAs have been established between two endpoints (e.g., gateways), an IPsec protocol may be used to protect data packets for transmission via the VPN. For example, each gateway may have an IPsec virtual tunnel interface (VTI) that provides a routable interface for terminating IPsec tunnels, and packets transmitted through the VTI may be encrypted and sent through IPsec tunnel. A gateway on which a "real" VPN session is configured actually performs VPN functionality (e.g., receiving, processing, and transmitting packets, and the like), while a gateway on which a "shadow" VPN session is configured operates as a "standby" gateway for that VPN session, maintaining configuration information of the VPN session without actually performing VPN functionality.

At step 308, manager 138 programs SNAT/DNAT entries associated with configuring the first VPN session into one or more NAT tables associated with NAT appliance 210. Programming of SNAT/DNAT entries is described above with respect to FIG. 2. In some embodiments, steps 306 and 308 are part of a single atomic operation.

At step 310, manager 138 evaluates computing resource utilization information associated with gateway 134$_1$ to determine whether the second VPN session can be configured on gateway 134$_1$. For example, manager 138 may determine that there are insufficient available computing resources (e.g., processing, memory, and/or network communication resources, and/or the like) on gateway 134$_1$ to support the second VPN session in addition to the first VPN session. Thus, at step 312, manager 138 brings up a new gateway 134$_2$, and configures the second VPN session on gateway 134$_2$. Bringing up gateway 134$_2$ may involve, for example, deploying a new VCI, allocating computing resources to the VCI, and configuring the VCI to perform gateway functionality (e.g., represented by ESG software, as described above). In alternative embodiments, gateway 134$_2$ already exists prior to configuration of the two VPN sessions, and manager 138 determines that gateway 134$_2$ has sufficient available computing resources to support the second VPN session.

A real VPN session is established between gateway 134$_2$ and data center 150 (e.g., with a corresponding gateway of data center 150) at step 314. Furthermore, at step 316, a shadow VPN session is established between gateway 134$_2$ and data center 150, such as by storing configuration information for the first VPN session from manager 138 on gateway 134₂ without gateway 134₂ performing VPN functionality for the first VPN session.

Manager 138 also, at step 312, configures gateway 134₁ with a shadow VPN session corresponding to the second VPN session. As such, at step 318, a shadow VPN connection is established between gateway gateway 134₁ and data center 150, such as by storing configuration information for the second VPN session from manager 138 on gateway gateway 134₁ without gateway 134₁ performing VPN functionality for the second VPN session.

In some embodiments information related to a secure tunnel established between a gateway and an endpoint for a real VPN session, such as a security association (SA), is also provided to one or more other gateways that have shadow VPN sessions with the endpoint. For example, once an IPSec tunnel is established between gateway 134₂ and data center 150 for the real VPN session, details such as an SA of the IPSec tunnel are provided to gateway gateway 134₁ for the shadow VPN session so that, if needed, the shadow VPN session can be quickly converted to a real VPN session that uses the same SA and/or other details of the established IPSec tunnel.

At step 320, manager 138 programs SNAT/DNAT entries associated with configuring the second VPN session into one or more NAT tables associated with NAT appliance 210. Programming of SNAT/DNAT entries is described above with respect to FIG. 2. In some embodiments steps 314 and 320 are part of a single atomic operation. Step 318 may also be part of this single atomic operation.

It is noted that the order and specific details of operations described with respect to FIG. 3 are included as examples, and other orders and embodiments are possible without departing from the scope of the present disclosure.

Figure 4:
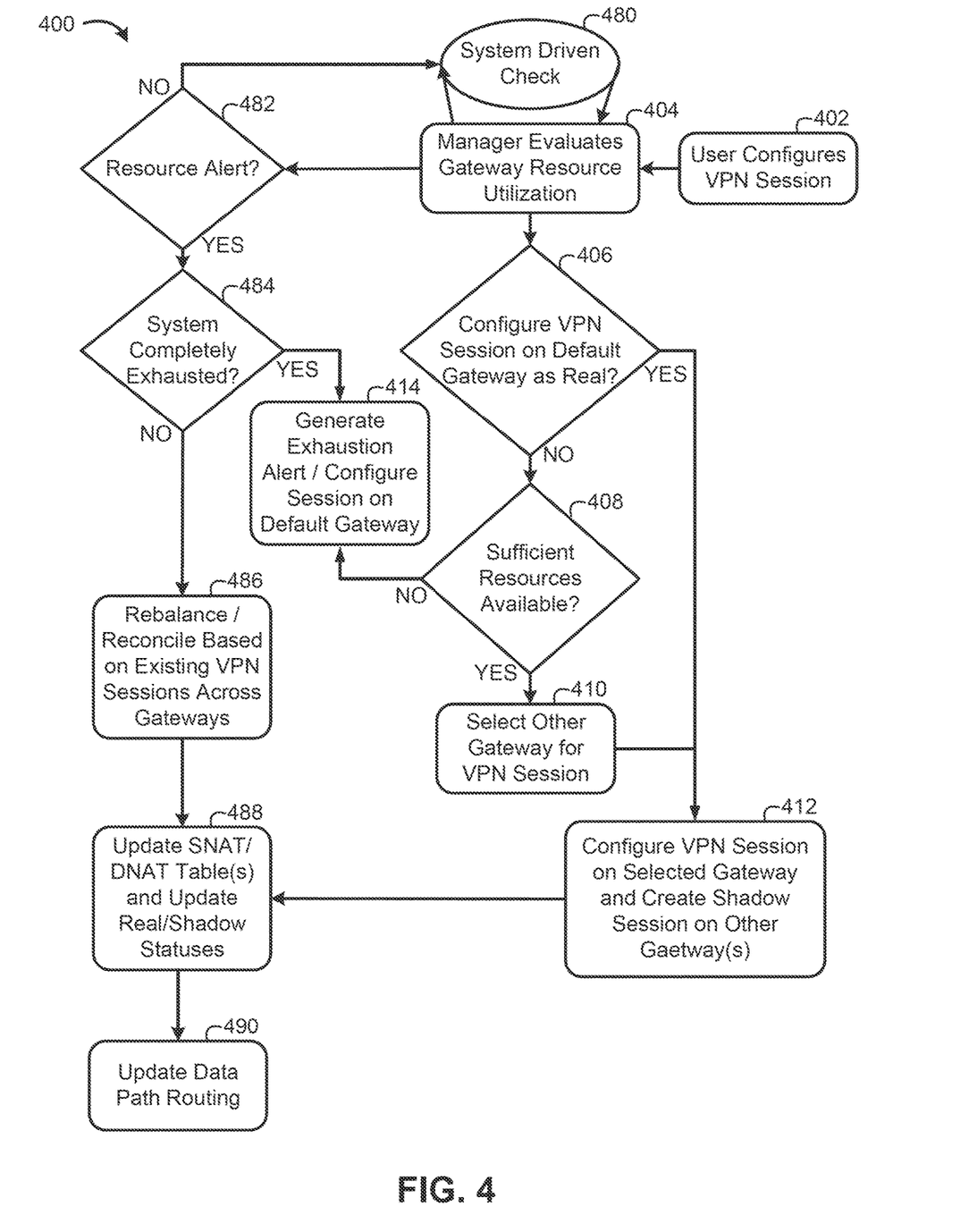
FIG. 4 is a flow chart related to dynamic VPN session distribution for gateways.

FIG. 4 is a flow chart 400 related to dynamic VPN session distribution for gateways. For example, the functionality described with respect to flow chart 400 may be performed by one or more components of data center 130 of FIG. 1.

At step 402, a user configures a VPN session, such as via providing input to manager 138 of FIG. 1. At step 404, the manager evaluates gateway resource utilization information, such as received from hypervisors associated with one or more gateways, and/or from one or more monitoring components that monitor resource utilization of VCIs. Gateway resource utilization information may include, for example, information related to utilization of processing, memory, and/or network communication resources, and/or the like at one or more gateways. For example, the utilization information may be provided or normalized into a percentage of available or allocated resources.

At step 406, the manager determines whether to configure the VPN session (e.g., specified by the user at step 402) on a default gateway (e.g., a gateway that provides gateway functionality for all types of traffic that are not otherwise designated to be handled by another gateway). For example, the manager may have compare resource requirements for the VPN session based on historical information or based on user input such as a certain amount of processor time, a certain amount of memory, and/or a certain amount of network bandwidth to be reserved for the VPN session. These requirements are then compared with resource availability at the default gateway. If the gateway has sufficient resources to accommodate the VPN session requirements, then the manager may decide to configure the VPN session on the default gateway. In this case, the operations proceeds at step 412, where the manager configures the VPN session on the default gateway (e.g., as a real VPN session) and, optionally, configures one or more shadow VPN sessions on one or more other gateways.

If, at step 406, the manager determines not to configure the VPN session on the default gateway, such as if there are insufficient computing resources available at the default gateway to support the VPN session, then operations proceed at step 408, where the manager determines if there are sufficient computing resources available on one or more other existing gateways and/or if there are sufficient system resources available to create a new gateway on which the VPN session can be configured.

If there is another existing gateway with sufficient resources available to support the VPN session or if there are sufficient system resources to create a new gateway to support the VPN session, then operations proceed at step 410, where the other existing or new gateway is selected for the VPN session and then to step 412, where the VPN session is configured on the selected gateway (and, optionally, configures one or more shadow VPN sessions on one or more other gateways).

If there is no existing gateway that can support the VPN session and there are insufficient system resources available to create a new gateway to support the VPN session, then operations proceed at step 414, where an alert is generated indicating that system resources have been exhausted. Furthermore, at step 414, the VPN session may be configured on the default gateway (e.g., so that the VPN session can function, even if poorly, until the resource exhaustion issue is addressed). An administrator may address the exhaustion alert by, for example, allocating additional resources from one or more physical computing devices in the data center for use by the existing gateways of the data center, or by instantiating new gateways and hence "scale-out" the gateway cluster.

Once the VPN session is configured on a gateway, operations proceed at step 488, with updating one or more SNAT/DNAT tables based on the configuration of the VPN session (e.g., as described above with respect to FIG. 2) and, if needed, updating real/shadow statuses of VPN sessions on gateways. For example, the manager may store statuses of VPN sessions indicating whether they are real VPN sessions or shadow VPN sessions. The operations then proceed at step 490, with updating data path routing based on the configuration of the VPN session. Updating data path routing generally involves updating one or more routing tables of the data center such that traffic within the data center that is to be transmitted via a VPN session is routed to the gateway that is currently configured with the corresponding real VPN session.

A system driven check, represented by step 480, may be performed on an ongoing basis, which may involve evaluating gateway resource utilization over time. For example, the gateway may continuously, or at regular intervals, receive information related to utilization of computing resources on all gateways. The manager may determine based on analyzing the gateway resource utilization information whether a resource alert has occurred, such as based on whether utilization of one or more types of computing resources at one or more gateways exceeds a threshold. For example, a resource alert may be triggered when one or more utilizations, e.g., processor utilization, networking utilization, and/or memory utilization, exceeds a particular threshold, e.g., 80%, on average over some period of time such as 5 minutes. For example, at step 482 the manager determines whether there is a resource alert and, if there is a resource alert, then operations continue at step 484.

Otherwise, operations continue at step 480 where the system driven resource utilization check continues.

At step 484, the manager determines whether the system resources are completely exhausted (e.g., if resources at all existing gateways are exhausted, i.e., they exceed some threshold as described above, and resources available for allocation to new gateways are exhausted). If system resources are exhausted, then operations continue at step 414, where an exhaustion alert is generated (e.g., to be addressed by a network administrator). If system resources are not completely exhausted, then the operations continue at step 486.

At step 486, the manager rebalances and/or reconciles all active VPN sessions based on the existing VPN sessions across all gateways. For example, rebalancing and/or reconciling may involve changing a shadow VPN connection on a first gateway into a real VPN connection and changing a corresponding real VPN connection a second gateway into a shadow VPN connection (e.g., if the first gateway has a larger amount of available computing resources to support the VPN connection). Generally, rebalancing and/or reconciling involves determining an optimal distribution of VPN sessions across available gateways based on up-to-date resource utilization information for the gateways. In some embodiments, moving a VPN session from a first gateway to a second gateway (e.g., swapping real/shadow statuses of corresponding VPN sessions at the two gateways) further involves transferring one or more security associations (SAs) from the first gateway to the second gateway. Thus, once the VPN session at the second gateway becomes the real VPN session, the second gateway can perform encryption/decryption of traffic for the VPN session based on the one or more SAs transferred from the first gateway.

Once rebalancing and/or reconciliation is complete, operations continue at step 488 with updating SNAT/DNAT table(s) as appropriate, as well as updating real/shadow statuses of VPN connections as appropriate based on the rebalancing and/or reconciliation. Finally, operations continue at step 490 with updating data path routing as needed (e.g., ensuring that all traffic on the data center that is to be transmitted via a VPN session is routed to the gateway that is currently configured to handle that VPN session).

Techniques described herein allow a load associated with VPN sessions with peer devices to be distributed in a dynamic manner without requiring any configuration changes at the peer devices. In some embodiments, resource utilization information (e.g., which may comprise time-series statistics indicating utilization of various types of computing resources over time) at each gateway is determined and used to dynamically place and/or move VPN sessions. As resource utilization at gateways changes, VPN sessions can be moved between gateways dynamically without the peer devices being aware of the moves. For example, by using NAT to expose a single public network address to peer devices for all VPN sessions, embodiments of the present disclosure do not require a peer device to be aware of which gateway is currently configured with a given VPN session with the peer device at any given time. Furthermore, by using real/shadow VPN sessions as described herein, a VPN session can be efficiently moved from a source gateway to a target gateway without requiring re-configuration of the VPN session on the target device in real-time, thereby increasing the speed with which the VPN session can be moved and avoiding interruptions in service.

Figure 5:
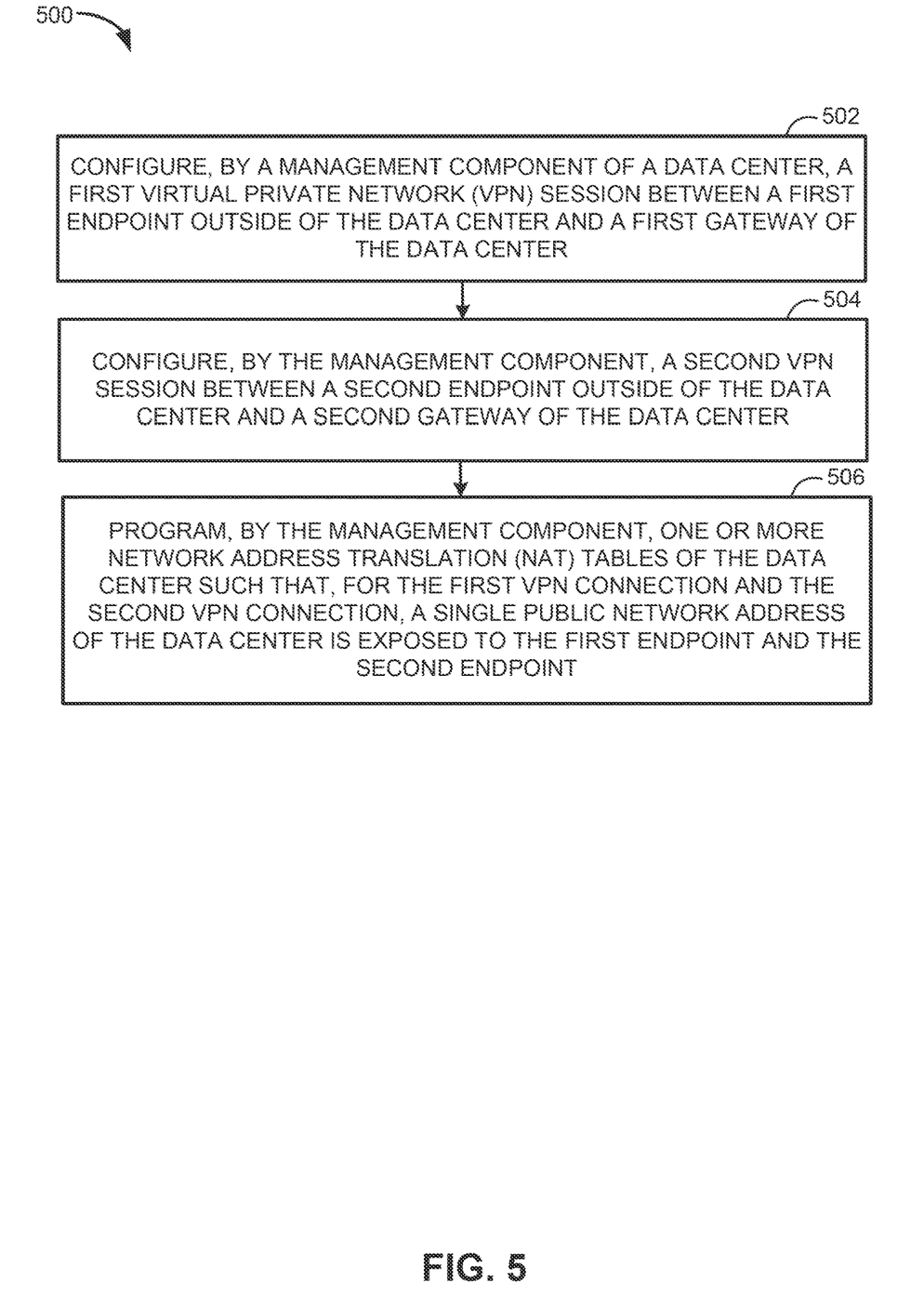
FIG. 5 depicts example operations related to dynamic VPN session distribution for gateways.

FIG. 5 depicts example operations 500 related to dynamic VPN session distribution for gateways. For example, operations 500 may be performed by one or more components of data center 130 of FIG. 1.

Operations 500 begin at step 502, with configuring, by a management component of a data center, a first virtual private network (VPN) session between a first endpoint outside of the data center and a first gateway of the data center.

Operations 500 continue at step 504, with configuring, by the management component, a second VPN session between a second endpoint outside of the data center and a second gateway of the data center.

Operations 500 continue at step 506, with programming, by the management component, one or more network address translation (NAT) tables of the data center such that, for the first VPN connection and the second VPN connection, a single public network address of the data center is exposed to the first endpoint and the second endpoint.

In some embodiments, programming the one or more NAT tables comprises programming a source NAT (SNAT) table such that source addresses of packets sent from the first gateway to the first endpoint are translated to the single public network address of the data center and source addresses of packets sent from the second gateway to the second endpoint are translated to the single public network address of the data center. Programming the one or more NAT tables may further comprise programming a destination NAT (DNAT) table such that destination addresses of packets sent from the first endpoint to the public network address of the data center are translated to a network address of the first gateway and destination addresses of packets sent from the second endpoint to the public network address of the data center are translated to a network address of the second gateway.

Certain embodiments further comprise configuring, by the management component, a first shadow VPN session between the first endpoint and the second gateway that corresponds to the first VPN session and configuring, by the management component, a second shadow VPN session between the second endpoint and the first gateway that corresponds to the second VPN session.

Some embodiments further comprise determining, by the management component, an occurrence of a condition related to computing resource utilization information of the first gateway or the second gateway and reconfiguring, by the management component, the first shadow VPN session or the second shadow VPN session to become a real VPN session based on the occurrence of the condition. Certain embodiments further comprise reconfiguring, by the management component, the first VPN session or the second VPN session to become a shadow VPN session based on the occurrence of the condition.

Certain embodiments further comprise determining, by the management component, computing resource utilization information for the first gateway and the second gateway. For example, the management component may select the first gateway for the first VPN session and the second gateway for the second VPN session based on the computing resource utilization information Some embodiments further comprise determining, by the management component, based on the computing resource utilization information, to create a third gateway of the data center for a third VPN session and configuring, by the management component, the third VPN session between a third endpoint outside of the data center and the third gateway.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of processing inter-network communications, comprising:
configuring, by a management component of a data center, a first virtual private network (VPN) session between a first endpoint outside of the data center and a first gateway of the data center;
configuring, by the management component, a second VPN session between a second endpoint outside of the data center and a second gateway of the data center; and programming, by the management component, one or more network address translation (NAT) tables of the data center such that, for the first VPN session and the second VPN session, a single public network address of the data center is exposed to the first endpoint and the second endpoint.

2. The method of claim 1, wherein programming the one or more NAT tables comprises:
programming a source NAT (SNAT) table such that:
source addresses of packets sent from the first gateway to the first endpoint are translated to the single public network address of the data center; and
source addresses of packets sent from the second gateway to the second endpoint are translated to the single public network address of the data center; and
programming a destination NAT (DNAT) table such that:
destination addresses of packets sent from the first endpoint to the single public network address of the data center are translated to a network address of the first gateway; and
destination addresses of packets sent from the second endpoint to the single public network address of the data center are translated to a network address of the second gateway.

3. The method of claim 1, further comprising:
configuring, by the management component, a first shadow VPN session between the first endpoint and the second gateway that corresponds to the first VPN session; and
configuring, by the management component, a second shadow VPN session between the second endpoint and the first gateway that corresponds to the second VPN session.

4. The method of claim 3, further comprising:
determining, by the management component, an occurrence of a condition related to computing resource utilization information for the first gateway or the second gateway; and
reconfiguring, by the management component, the first shadow VPN session or the second shadow VPN session to become a real VPN session based on the occurrence of the condition.

5. The method of claim 4, further comprising reconfiguring, by the management component, the first VPN session or the second VPN session to become a shadow VPN session based on the occurrence of the condition.

6. The method of claim 1, further comprising determining, by the management component, computing resource utilization information for the first gateway and the second gateway, wherein the management component selects the first gateway for the first VPN session and the second gateway for the second VPN session based on the computing resource utilization information.

7. The method of claim 6, further comprising:
determining, by the management component, based on the computing resource utilization information, to create a third gateway of the data center for a third VPN session; and
configuring, by the management component, the third VPN session between a third endpoint outside of the data center and the third gateway.

8. The method of claim 6, wherein the computing resource utilization information comprises information relating to one or more of:
processor utilization;
memory utilization;
network resource utilization;
uplink traffic; or
downlink traffic.

9. A system for processing inter-network communications, the system comprising:
at least one memory; and
at least one processor coupled to the at least one memory, the at least one processor and the at least one memory configured to:
configure, by a management component of a data center, a first virtual private network (VPN) session between a first endpoint outside of the data center and a first gateway of the data center;
configure, by the management component, a second VPN session between a second endpoint outside of the data center and a second gateway of the data center; and
program, by the management component, one or more network address translation (NAT) tables of the data center such that, for the first VPN session and the second VPN session, a single public network address of the data center is exposed to the first endpoint and the second endpoint.

10. The system of claim 9, wherein programming the one or more NAT tables comprises:
programming a source NAT (SNAT) table such that:
source addresses of packets sent from the first gateway to the first endpoint are translated to the single public network address of the data center; and
source addresses of packets sent from the second gateway to the second endpoint are translated to the single public network address of the data center; and
programming a destination NAT (DNAT) table such that:
destination addresses of packets sent from the first endpoint to the single public network address of the data center are translated to a network address of the first gateway; and
destination addresses of packets sent from the second endpoint to the single public network address of the data center are translated to a network address of the second gateway.

11. The system of claim 9, wherein the at least one processor and the at least one memory are further configured to:
configure, by the management component, a first shadow VPN session between the first endpoint and the second gateway that corresponds to the first VPN session; and
configure, by the management component, a second shadow VPN session between the second endpoint and the first gateway that corresponds to the second VPN session.

12. The system of claim 11, wherein the at least one processor and the at least one memory are further configured to:
determine, by the management component, an occurrence of a condition related to computing resource utilization information for the first gateway or the second gateway; and
reconfigure, by the management component, the first shadow VPN session or the second shadow VPN session to become a real VPN session based on the occurrence of the condition.

13. The system of claim 12, wherein the at least one processor and the at least one memory are further configured to reconfigure, by the management component, the first VPN session or the second VPN session to become a shadow VPN session based on the occurrence of the condition.

14. The system of claim 9, wherein the at least one processor and the at least one memory are further configured to determine, by the management component, computing resource utilization information for the first gateway and the second gateway, wherein the management component selects the first gateway for the first VPN session and the second gateway for the second VPN session based on the computing resource utilization information.

15. The system of claim 14, wherein the at least one processor and the at least one memory are further configured to:
  determine, by the management component, based on the computing resource utilization information, to create a third gateway of the data center for a third VPN session; and
  configure, by the management component, the third VPN session between a third endpoint outside of the data center and the third gateway.

16. The system of claim 14, wherein the computing resource utilization information comprises information relating to one or more of:
  processor utilization;
  memory utilization;
  network resource utilization;
  uplink traffic; or
  downlink traffic.

17. A non-transitory computer-readable medium storing instructions that, when executed by one or more processors, cause the one or more processors to:
  configure, by a management component of a data center, a first virtual private network (VPN) session between a first endpoint outside of the data center and a first gateway of the data center;
  configure, by the management component, a second VPN session between a second endpoint outside of the data center and a second gateway of the data center; and
  program, by the management component, one or more network address translation (NAT) tables of the data center such that, for the first VPN session and the second VPN session, a single public network address of the data center is exposed to the first endpoint and the second endpoint.

18. The non-transitory computer-readable medium of claim 17, wherein programming the one or more NAT tables comprises:
  programming a source NAT (SNAT) table such that:
    source addresses of packets sent from the first gateway to the first endpoint are translated to the single public network address of the data center; and
    source addresses of packets sent from the second gateway to the second endpoint are translated to the single public network address of the data center; and
  programming a destination NAT (DNAT) table such that:
    destination addresses of packets sent from the first endpoint to the single public network address of the data center are translated to a network address of the first gateway; and
    destination addresses of packets sent from the second endpoint to the single public network address of the data center are translated to a network address of the second gateway.

19. The non-transitory computer-readable medium of claim 17, wherein the instructions, when executed by the one or more processors, further cause the one or more processors to:
  configure, by the management component, a first shadow VPN session between the first endpoint and the second gateway that corresponds to the first VPN session; and
  configure, by the management component, a second shadow VPN session between the second endpoint and the first gateway that corresponds to the second VPN session.

20. The non-transitory computer-readable medium of claim 19, wherein the instructions, when executed by the one or more processors, further cause the one or more processors to:
  determine, by the management component, an occurrence of a condition related to computing resource utilization information for the first gateway or the second gateway; and
  reconfigure, by the management component, the first shadow VPN session or the second shadow VPN session to become a real VPN session based on the occurrence of the condition.

* * * * *